(12) United States Patent
Kong

(10) Patent No.: US 9,323,119 B2
(45) Date of Patent: Apr. 26, 2016

(54) LIQUID CRYSTAL DISPLAY DEVICE

(71) Applicant: LG Display Co., Ltd., Seoul (KR)

(72) Inventor: Chung Sik Kong, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 173 days.

(21) Appl. No.: 13/725,108

(22) Filed: Dec. 21, 2012

(65) Prior Publication Data

US 2013/0229591 A1  Sep. 5, 2013

(30) Foreign Application Priority Data

Mar. 2, 2012  (KR) .................. 10-2012-0021889

(51) Int. Cl.
*G02F 1/1333* (2006.01)
*G02F 1/1362* (2006.01)

(52) U.S. Cl.
CPC .......... *G02F 1/136209* (2013.01); *G02F 2001/133374* (2013.01)

(58) Field of Classification Search
CPC .......................................... G02F 2001/133374
See application file for complete search history.

(56) References Cited

U.S. PATENT DOCUMENTS

| | | | | |
|---|---|---|---|---|
| 5,335,102 A * | 8/1994 | Kanemori et al. | ............ | 349/55 |
| 5,361,150 A * | 11/1994 | Noguchi | ............ | G02F 1/1309 349/139 |
| 5,943,107 A * | 8/1999 | Kadota et al. | ............ | 349/44 |
| 6,515,730 B1 * | 2/2003 | Maeda | ............ | 349/187 |
| 6,650,394 B1 * | 11/2003 | Kim | ............ | G02F 1/1333 349/158 |
| 6,667,792 B2 * | 12/2003 | Park | ............ | G02F 1/1333 349/158 |
| 6,674,495 B1 | 1/2004 | Hong et al. | | |
| 6,734,931 B2 * | 5/2004 | Yu | ............ | G02F 1/133514 349/106 |
| 6,822,263 B2 * | 11/2004 | Satou et al. | ............ | 257/59 |
| 2003/0201440 A1 | 10/2003 | Satou et al. | | |
| 2007/0025705 A1 * | 2/2007 | Yoon | ............ | G02F 1/133351 386/201 |
| 2007/0045624 A1 | 3/2007 | Satou et al. | | |
| 2008/0136993 A1 * | 6/2008 | Jeong et al. | ............ | 349/56 |
| 2009/0035492 A1 | 2/2009 | Amano et al. | | |
| 2011/0198607 A1 | 8/2011 | Mori et al. | | |

FOREIGN PATENT DOCUMENTS

| | | |
|---|---|---|
| CN | 1290922 A | 4/2001 |
| EP | 0 708 356 A3 | 2/1997 |
| JP | 4-283729 A | 10/1992 |
| JP | 6-104434 A | 4/1994 |
| JP | 6-242453 A | 9/1994 |
| JP | 8-62579 A | 3/1996 |
| JP | 8-306640 A | 11/1996 |
| JP | 9-139504 A | 5/1997 |
| JP | 11-109412 A | 4/1999 |
| JP | 11-202277 A | 7/1999 |
| JP | 2000-81636 A | 3/2000 |
| JP | 2001-148480 A | 5/2001 |

(Continued)

*Primary Examiner* — Jessica M Merlin
*Assistant Examiner* — Mark Teets
(74) *Attorney, Agent, or Firm* — Birch, Stewart, Kolasch & Birch, LLP

(57) ABSTRACT

Discussed is an LCD device which includes: a substrate; an array cell formed on the substrate and defined into a display area and a non-display area; a thin film transistor formed on the display area of the array cell; a light blocking layer configured to block light being irradiated to a semiconductor layer of the thin film transistor; and an identification mark layer used for writing information about the array cell and formed in the same layer as the light block layer.

15 Claims, 3 Drawing Sheets

(56) References Cited

FOREIGN PATENT DOCUMENTS

| | | |
|---|---|---|
| JP | 2006-332314 A | 12/2006 |
| JP | 2008-216849 A | 9/2008 |
| JP | 2009-34905 A | 2/2009 |
| JP | 2009-54703 A | 3/2009 |
| JP | 2009-193996 A | 8/2009 |
| JP | 2011-187931 A | 9/2011 |

* cited by examiner

|  | RELATED ART | PRESENT EMBODIMENT | NOTE |
|---|---|---|---|
| POWER | 1.56W | 0.624W | REDUCTION OF 60% |
| FREQUENCY | 70kHz | 40kHz |  |
| PEAK POWER | 223mW | 156mW |  |

LIQUID CRYSTAL DISPLAY DEVICE

The present application claims priority under 35 U.S.C. §119(a) of Korean Patent Application No. 10-2012-0021889 filed on Mar. 2, 2012, which is hereby incorporated by reference in its entirety.

BACKGROUND

1. Field of the Disclosure

The present application relates to a liquid crystal display device.

2. Description of the Related Art

With the development of an information society, the requirements for display devices used to display images have been increased in a variety of manners. As such, flat panel display devices being thinner and lighter weight compared to cathode ray tubes (CRTs) of the related art are being actively researched and manufactured. The flat panel display devices include liquid crystal display (LCD) devices, plasma display devices (PDPs), organic light emitting display (OLED) devices and so on. Among the flat panel display devices, the LCD devices are now widely being used because of features such as small size, light weight, slimness and low power drive.

In general, the LCD display device includes a thin film transistor array substrate in which thin film transistors are arranged, a color filter array substrate in which color filters are arranged, and a liquid crystal layer interposed between the two substrates. The LCD display device can be fabricated by sequentially performing a transistor fabrication process, a color filter fabrication process, a liquid crystal cell fabrication process and a module fabrication process.

The liquid crystal cell fabrication process can include an alignment film formation process for aligning liquid crystal molecules, a cell gap formation process, a liquid crystal injection process, a cell cutting process and an inspection process.

In order to provide process efficiency to process automation, a titling process of forming an identification mark on an array substrate for the LCD display device can be performed when the LCD display device is fabricated. As such, the liquid crystal cell formation process can include the titling process of forming an identification mark on the substrate in unit cells.

FIG. 1 is a planar view showing an array substrate of an LCD display device according to the related art.

Referring to FIG. 1, the array substrate 101 of the related art LCD display device includes a plurality of array cells 110 formed on a substrate 101.

The plurality of array cells 110 are each defined into a display area 111 used to display images and a non-display area 113 in which any image is not displayed.

An identification mark layer 115 can be formed on the non-display area 113. The identification mark layer 115 can be formed when not shown gate or data lines are formed on each array cell 110. An identification mark can be written on the identification mark layer 115. The identification mark can be process information about each array cell. The identification mark can be formed on the identification mark layer by a pulsed laser beam in an intaglio shape.

The identification mark layer 115 is formed in the same metal layer as the gate or data line with a thickness of several thousand angstroms. As such, a high energy pulsed laser beam must be used for writing the identification mark. The high energy pulsed laser beam can cause cracks insulation layers stacked on upper and lower surfaces of the identification mark layer, as shown in FIG. 2. In accordance therewith, the substrate can be damaged by external impacts applied to the crack portions.

BRIEF SUMMARY

Accordingly, embodiments of the present application are directed to an LCD device that substantially obviates one or more of problems due to the limitations and disadvantages of the related art.

The embodiments are to provide an LCD device that is adapted to prevent the generation of cracks in a substrate when an identification mark is written.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

According to a first general aspect of the present embodiment, an LCD device includes: a substrate; an array cell formed on the substrate and defined into a display area and a non-display area; a thin film transistor formed on the display area of the array cell; a light blocking layer configured to block light being irradiated to a semiconductor layer of the thin film transistor; and an identification mark layer used for writing information about the array cell and formed in the same layer as the light block layer.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated herein and constitute a part of this application, illustrate embodiment(s) of the present disclosure and together with the description serve to explain the disclosure. In the drawings.

DETAILED DESCRIPTION OF THE EMBODIMENTS

Figure 1:
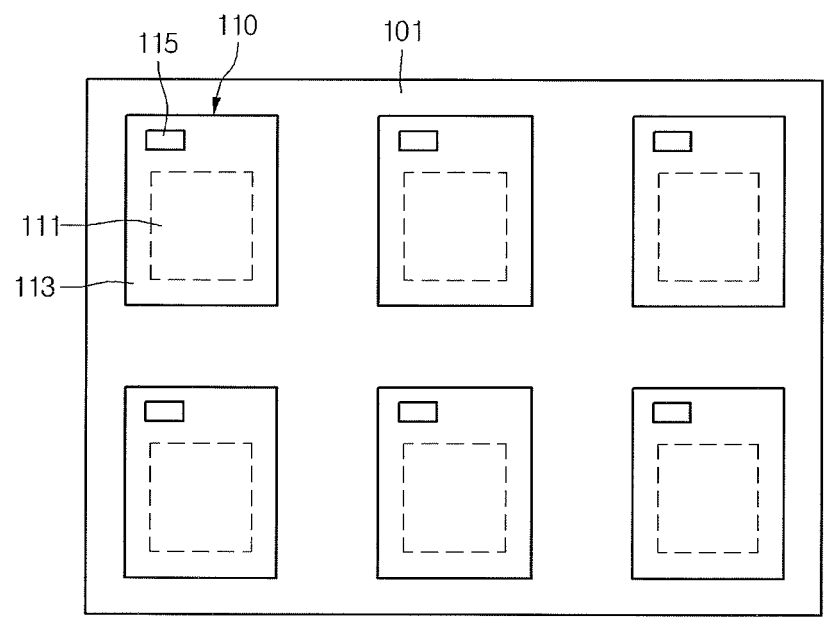
FIG. 1 is a planar view an array substrate of an LCD display device according to the related art.
Figure 2:
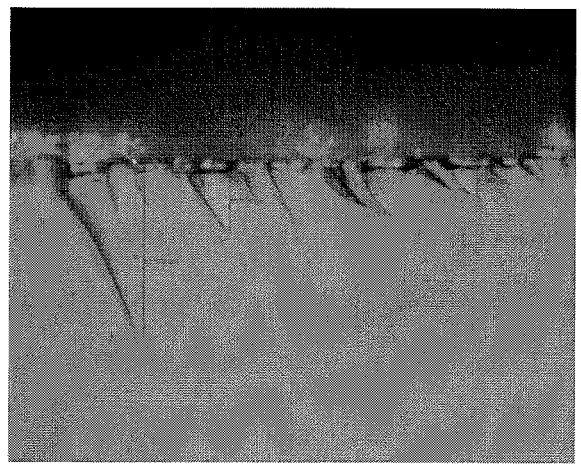
FIG. 2 is a planar view illustrating the generation of cracks when an identification mark is written.

In the present disclosure, it will be understood that when an element, such as a substrate, a layer, a region, a film, or an electrode, is referred to as being formed "on" or "under" another element in the embodiments, it may be directly on or under the other element, or intervening elements (indirectly) may be present. The term "on" or "under" of an element will be determined based on the drawings.

Reference will now be made in detail to the present embodiments, examples of which are illustrated in the accompanying drawings. In the drawings, the sizes and thicknesses of elements can be exaggerated, omitted or simplified for clarity and convenience of explanation, but they do not mean the practical sizes of elements.

Figure 3:
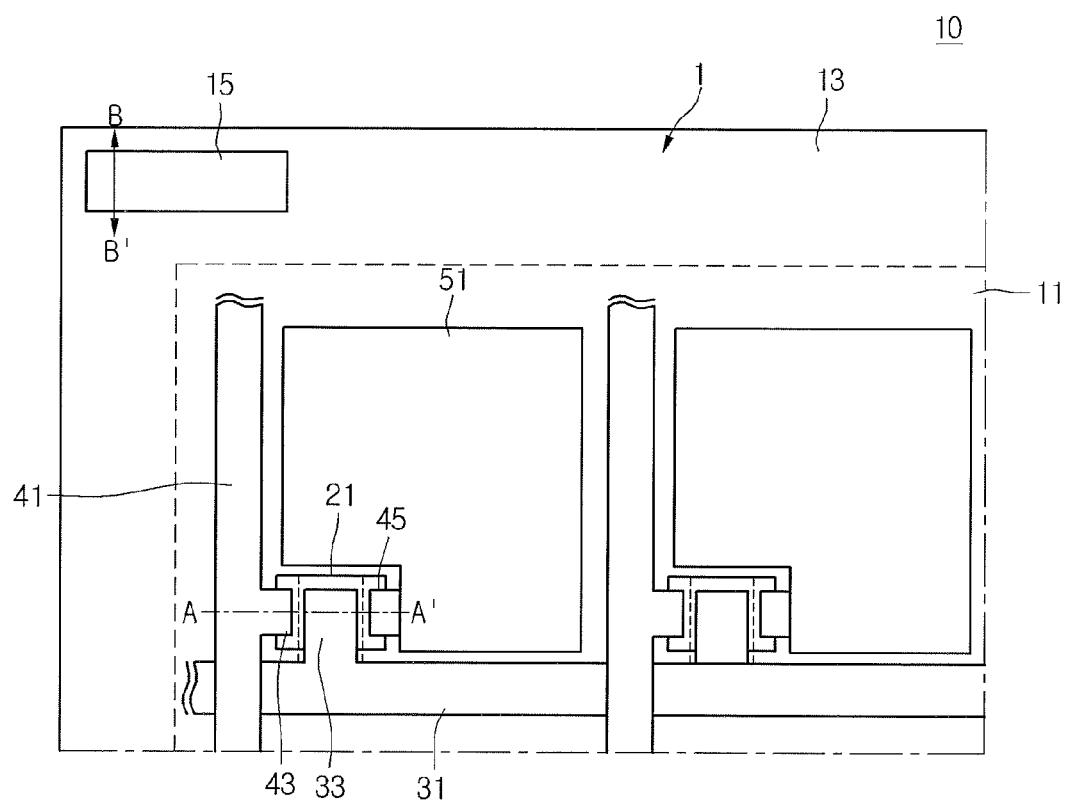
FIG. 3 is a planar view showing a part of an array cell of an LCD display device according to an embodiment of the present disclosure.

FIG. 3 is a planar view showing a part of an array cell of an LCD display device according to an embodiment of the present disclosure.

Referring to FIG. 3, an array cell 10 of the LCD device according to an embodiment of the present disclosure can be defined into a display area 11 used to display images and a non-display area 13 in which any image is not displayed. The non-display area 13 can be defined in such a manner as to surround edges of the display area 11.

The display area 11 can be defined into a plurality of pixel regions.

Each of the pixel regions can be defined by a gate line 31 and a data line 41 crossing each other. The gate line 31 can be formed by extending along a first direction. The data line 41 can be formed by extending along a second direction crossing the gate line 31. A thin film transistor can be electrically connected to the gate line 31 and the data line 41.

The thin film transistor can include a gate electrode 33, a semiconductor layer 21, a source electrode 43 and a drain electrode 45.

The gate line 31 can be electrically connected to the gate electrode 33 of the thin film transistor. The data line 41 can be electrically connected to the source electrode 43 of the thin film transistor.

The gate electrode 33 can be formed by protruding from the gate line 31. In other words, the gate electrode 33 can be formed in a protrusion shape protruded from the gate line 31. The source electrode 43 can be formed by protruding from the data line 41. In other words, the source electrode 43 can be formed in a protrusion shape protruded from the data line 41.

A pixel electrode 51 can be formed on each pixel region. The pixel electrode 51 can be electrically connected to the drain electrode 45 of the thin film transistor. Such a pixel electrode 51 can be formed from a transparent conductive material.

An identification mark layer 15 can be formed on the non-display area 13.

An identification mark can be written on the identification mark layer 15. The identification mark can be process information about each array cell 10. The identification mark can be formed on the identification mark layer in an intaglio shape using a pulsed laser beam.

Figure 4:
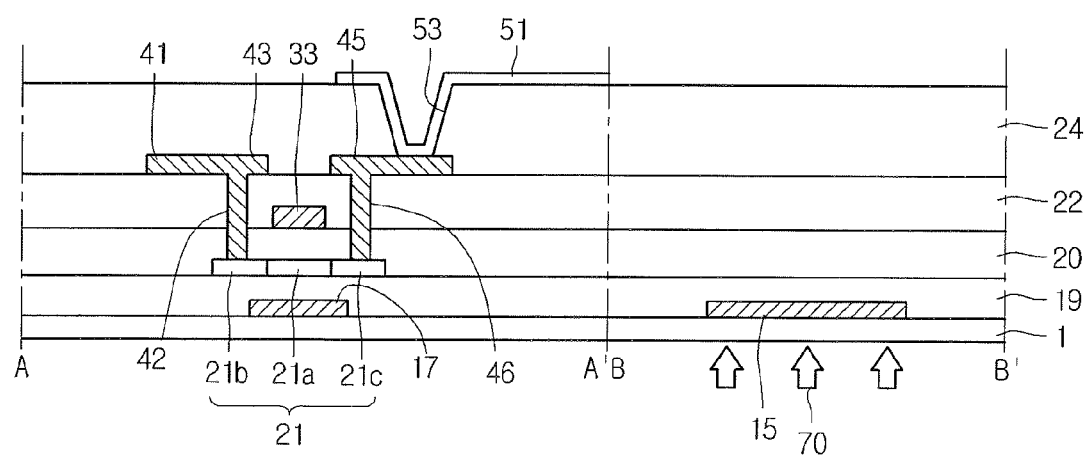
FIG. 4 is a cross-sectional view showing the array cell of the LCD display device taken along lines A-A' and B-B' in FIG. 3.

FIG. 4 is a cross-sectional view showing an array cell of the LCD display device which taken along lines A-A' and B-B' in FIG. 3.

Referring to FIG. 4, a light blocking layer 17 and an identification mark layer 15 can be formed on a substrate 1.

The light blocking layer 17 can be formed on a region opposite to a channel region 21a of a semiconductor layer 21 which will be formed later. In detail, the light blocking layer 17 can be formed on a region opposite to a gate electrode 33 which will be formed later.

The light blocking layer 17 has a function of shielding light irradiated from a backlight unit to the channel region 21a of the semiconductor layer 21. As such, the light blocking layer 17 can prevent current leakage due to carriers formed by light. The light blocking layer 17 can be formed to have an area wider than the channel region 21a of the semiconductor layer 21. Although it is not shown in the drawings, the light blocking layer 17 can be formed to have an area wider than the semiconductor layer 21. The light blocking layer 17 formed to have a wider area compared to the semiconductor layer 21 can protect the semiconductor layer 21 from light of the backlight unit.

The identification mark layer 15 can be formed in one edge of the non-display area 13. An identification mark can be written on the identification mark layer 15. The identification mark can be process information about each array cell 10. The identification mark can be formed on the identification mark layer 15 in an intaglio shape using a pulsed laser beam.

The identification mark layer 15 can be formed through the same process as the light blocking layer 17. Also, the identification mark layer 15 can be formed from the same material as the light blocking layer 17. For example, the identification mark layer 15 and the light blocking layer 17 can be formed from at least one selected from a material group which includes titanium Ti, chromium Cr, nickel Ni, aluminum Al, platinum Pt, gold Au, tungsten W, copper Cu and molybdenum Mo.

The identification mark layer 15 and the light blocking layer 17 can be formed in a thickness of several angstroms. Preferably, the identification mark layer 15 and the light blocking layer 17 are formed in a thickness range of about 300~500Å. The light blocking layer 17 is used to block only light irradiated from the backlight unit to the channel region 21a of the semiconductor layer 21. As such, the light blocking layer 17 can be formed thinner than the gate line or the data line used to transfer a signal.

The identification mark layer 15 can be formed from molybdenum Mo suitable to reflect light, in order to recycle reflected light. As such, the identification mark layer 15 can reduce power consumption and enhance brightness. Also, the identification mark layer 15 with the thickness of several hundred angstroms can enable the identification mark to be written by a low energy pulsed laser beam 70. Preferably, the identification mark layer 15 is formed in a thickness range of about 300~500Å. As such, the generation of cracks in the substrate 1 or an insulation film by the laser beam can be prevented. In accordance therewith, damage of the LCD device due to external impacts can be prevented, and furthermore reliability of the LCD device can be enhanced.

A buffer layer 19 can be formed on the substrate 1 provided with the identification mark layer 15 and the light blocking layer 17. The buffer layer 19 can prevent the intrusion of impurities passing through the substrate 1. Also, the buffer layer 19 can reduce step coverage caused by the identification mark layer 15 and the light blocking layer 17. Such a buffer layer 19 can be formed from a silicon oxide, such as $SiO_2$, or others.

The semiconductor layer 21 can be formed on the buffer layer 19. The semiconductor layer 21 can be defined into the channel region 21a, a source region 21b and a drain region 21c. The source region 21b and the drain region 21c can be formed by both side ends of the channel region 21a. The channel region 21a can be formed on a region of the buffer layer 19 opposite to the light blocking layer 17. The semiconductor layer 21 can be formed from poly-crystalline silicon. Also, the semiconductor layer 21 can be formed through a low temperature poly-silicon (LTPS) process.

A gate insulation film 20 can be formed on the semiconductor layer 21 and the buffer layer 19. The gate insulation film 20 is used to electrically separate the semiconductor layer 21 from a gate electrode 33 which will be formed later. As such, the gate insulation film 20 must have a superior insulation property. Such a gate insulation film 20 can be formed from one of an inorganic insulation material and an organic insulation material. The inorganic insulation material can include silicon nitride SiNx and silicon oxide SiOx. The organic insulation material can include benzocyclobutene BCB and so on.

The gate electrode 33 and a gate line 31 can be formed on the gate insulation film 20. The gate electrode 33 can be electrically connected to the gate line 31. Also, the gate electrode 33 can be formed by protruding from the gate line 31. Moreover, the gate electrode 33 can be formed at a position opposite to the channel region 21a of semiconductor layer 21 and the light blocking layer 17. Such gate electrode 33 and gate line 31 can be formed a gate metal material. The gate metal material can include at least one selected from a material group which consists of titanium Ti, chromium Cr, nickel Ni, aluminum Al, platinum Pt, gold Au, tungsten W, copper Cu and molybdenum Mo.

An interlayer insulation film 22 can be formed on the gate insulation film 20 provided with the gate line 31 and the gate electrode 33. The interlayer insulation film 22 is used to electrically separate the gate electrode 33 from source and drain electrodes 43 and 45 which will be formed later. As such, the interlayer insulation film 22 must have a superior insulation property. Such an interlayer insulation film 22 can be formed from one of an inorganic insulation material and an organic insulation material. The inorganic insulation material can include silicon nitride SiNx and silicon oxide SiOx. The organic insulation material can include benzocyclobutene BCB and so on.

A source contact hole 42 and a drain contact hole 46 can be formed in the interlayer insulation film 22 and the gate insulation film 20. The source contact hole 42 can pass through the interlayer insulation film 22 and the gate insulation film 20 and expose the source region 21b of the semiconductor layer 21. The drain contact hole 46 can pass through the interlayer insulation film 22 and the gate insulation film 20 and expose the drain region 21c of the semiconductor layer 21. In other words, the source contact hole 42 and the drain contact hole 46 can be formed in such a manner as to pass through the interlayer insulation film 22 and the gate insulation film 20, in order to expose the source region 21b and the drain region 21c of the semiconductor layer 21.

The source and drain electrodes 43 and 45 and a data line 41 can be formed on the interlayer insulation film 22 provided with the source and drain contact holes 42 and 46. The source electrode 43 can be electrically connected to the data line 41. Also, the source electrode 43 can be formed by protruding from the data line 41. Moreover, the source electrode 43 can be electrically connected to the source region 21b of the semiconductor layer 21 through the source contact hole 42. The drain electrode 45 can be electrically connected to the drain region 21c of the semiconductor layer 21. The data line 41, the source electrode 43 and the drain electrode 45 can be formed from a data metal material. The data metal material can include at least one selected from a material group which consists of titanium Ti, chromium Cr, nickel Ni, aluminum Al, platinum Pt, gold Au, tungsten W, copper Cu and molybdenum Mo.

A passivation layer 24 can be formed on the interlayer insulation film 22 provided with the data line 41, the source electrode 43 and the drain electrode 45. The passivation layer 24 can have a function of protecting the principal components of the thin film transistor from external substances. Such a passivation layer 24 can be formed from one of an inorganic insulation material and an organic insulation material. The inorganic insulation material can include silicon nitride SiNx and silicon oxide SiOx. The organic insulation material can include benzocyclobutene BCB and so on.

A pixel contact hole 53 exposing the drain electrode 45 can be formed in such a manner as to pass through the passivation layer 24. A pixel electrode 51 can be formed in a pixel region on the passivation layer 24. The pixel electrode 51 can be electrically connected to the drain electrode 45 via the pixel contact hole 53. Such a pixel electrode 51 can be formed from a transparent conductive material. For example, the pixel electrode 51 can be formed from one of indium-tin-oxide ITO, indium-zinc-oxide IZO and indium-tin-zinc-oxide ITZO.

Figures 5, 6:
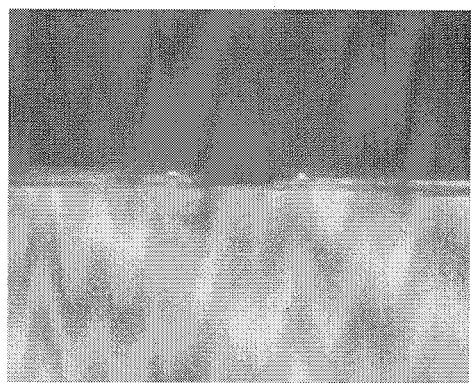
FIG. 5 is a table illustrating laser pulse beams each used for writing an identification mark according to the present embodiment and the related art.
FIG. 6 is a planar view showing the state of an identification mark layer of the LCD display device according to an embodiment of the present disclosure.

FIG. 5 is a table comparing laser pulse beams each used for writing an identification mark according to the present embodiment and the related art.

Table of FIG. 5 compares the intensity of a pulsed laser beam, which is irradiated to the related art identification mark layer formed from the same material and in the same layer as the gate line or the data line, and the intensity of another pulsed laser beam which is irradiated to the identification mark layer according to the present embodiment.

The related art identification mark layer is formed from the same material and in the same layer as the gate or data line and in a thickness range of about 2000~5000Å. The pulsed laser beam irradiated to the related art identification mark layer has a power of 1.56 W, a frequency of about 70 KHz and a peak power of 223 mW.

Meanwhile, the identification mark layer of the present embodiment is formed from the same material and in the same layer as the light blocking layer and in a thickness range of several hundred angstroms, preferably of 300~500Å. The pulsed laser beam irradiated to the identification mark layer of the present embodiment can have a 0.624 W, a frequency of about 40 KHz and a peak power of 156 mW.

The power means a total energy per unit time. Also, the peak power means a power quantity for a single pulse of the pulsed laser beam.

The intensity of the pulsed laser beam of the related art and the intensity of the pulsed laser beam according to the present embodiment correspond to an intensity of the pulsed laser beam high enough to recognize the identification mark through an optical character reader OCR.

As seen from table of FIG. 5, it is evident that the present embodiment using a low power laser beam of 0.624 mW can provide the power reduction effect of 60% compared to the related art using a high power laser beam of 1.56 W. Such power reduction can enable process yields to be enhanced.

FIG. 6 is a planar view showing the state of an identification mark layer of the LCD display device according to an embodiment of the present disclosure.

As shown in FIG. 6, any crack is not generated in upper and lower layers of the identification mark layer according to the present embodiment.

More specifically, cracks are generated in a substrate or an insulation layer positioned on the lower or upper surface of the related art identification mark layer. However, the identification mark layer of the present embodiment is formed in the same layer as the light blocking layer. As such, the generation of a crack in the substrate or the buffer layer positioned on the lower or upper surface of the identification mark layer can be prevented.

The generation of a crack in the substrate depends on the peak power and the frequency of the pulsed laser beam. In the present embodiment, if the identification mark is written using a pulsed laser beam with the frequency of about 40 KHz and the peak power of about 156 mW, any crack is not generated. Since the generation of a crack in the substrate or the insulation film is prevented, damage of the LCD device can be prevented. Moreover, reliability of the LCD device can be enhanced.

As described above, the present embodiment allows the identification mark layer to be formed in the same layer as the thin light blocking layer. As such, the generation of a crack in the substrate can be prevented. In accordance therewith, endurance of the LCD device against external impacts can be enhanced, and furthermore reliability of the LCD device can be enhanced.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A liquid crystal display device comprising:
   a substrate;
   an array cell on the substrate and defined into a display area and a non-display area;
   a thin film transistor on the display area of the array cell;
   a light blocking layer configured to block light being irradiated to a semiconductor layer of the thin film transistor; and
   an identification mark layer used for writing information about the array cell and placed in the same layer as the light block layer, the identification mark layer having a surface that faces the substrate,
   wherein the identification mark layer has an identification mark on the surface that faces the substrate,
   wherein the surface that faces the substrate directly and physically contacts the substrate, and
   wherein the identification mark on the surface that faces the substrate is an intaglio shape.

2. The liquid crystal display device of claim 1, wherein the identification mark layer is on the non-display area of the array cell.

3. The liquid crystal display device of claim 1, wherein the light blocking layer is between the substrate and the thin film transistor.

4. The liquid crystal display device of claim 1, wherein the thickness of the identification mark layer is smaller than that of a gate electrode of the thin film transistor.

5. The liquid crystal display device of claim 1, wherein a thickness of the identification mark layer and a thickness of the light blocking layer are within a range of about 300~500Å.

6. The liquid crystal display device of claim 5, wherein a thickness of a gate electrode of the thin film transistor is within a range of about 2000~5000Å.

7. The liquid crystal display device of claim 1, wherein the identification mark layer is formed from at least one selected from a material group which consists of titanium Ti, chromium Cr, nickel Ni, aluminum Al, platinum Pt, gold Au, tungsten W, copper Cu and molybdenum Mo.

8. The liquid crystal display device of claim 1, wherein the information about the array cell is written on the identification mark layer using a pulsed laser beam.

9. The liquid crystal display device of claim 1, wherein the light blocking layer is in a region opposite to a channel region of the semiconductor layer.

10. The liquid crystal display device of claim 1, wherein the light blocking layer has an area wider than the semiconductor layer.

11. The liquid crystal display device of claim 1, wherein the semiconductor layer is formed from poly-crystalline silicon.

12. The liquid crystal display device of claim 1, wherein the thin film transistor includes:
   a buffer layer to cover the light blocking layer, which configured to prevent external substances in-flowed from the substrate;
   the semiconductor layer on the buffer layer, which is defined into a channel region and source and drain regions positioned by both side ends of the channel region;
   a gate insulation film to cover the semiconductor layer;
   a gate electrode on the gate insulation film;
   an interlayer insulation film to cover the gate electrode;
   a source electrode on the interlayer insulation film, which is electrically connected to the source region; and
   a drain electrode on the interlayer insulation film, which is electrically connected to the drain region.

13. The liquid crystal display device of claim 12, further comprising:
   a passivation layer on the interlayer insulation film, which is provided with the source and drain electrodes; and
   a pixel electrode on the passivation layer, which is electrically connected to the drain electrode.

14. The liquid crystal display device of claim 10, wherein the identification mark layer is between the substrate and a buffer layer and configured to prevent foreign substances through the substrate.

15. The liquid crystal display device of claim 1, wherein the identification mark layer has the surface that directly and physically contacts the substrate and another surface that is opposite from the surface that directly and physically contacts the substrate, and
   wherein the another surface is closer to the thin film transistor than the surface that directly and physically contacts the substrate.

* * * * *